(12) United States Patent
Tokita

(10) Patent No.: US 11,838,474 B2
(45) Date of Patent: Dec. 5, 2023

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Ken Tokita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/300,881

(22) Filed: Apr. 14, 2023

(65) Prior Publication Data

US 2023/0344950 A1   Oct. 26, 2023

(30) Foreign Application Priority Data

Apr. 21, 2022   (JP) .................. 2022-070094

(51) Int. Cl.
  *G06F 3/12*       (2006.01)
  *H04N 1/32*       (2006.01)
  *G06V 30/14*      (2022.01)
  *G06F 3/04812*    (2022.01)
  *G06F 3/0486*     (2013.01)

(52) U.S. Cl.
  CPC ....... *H04N 1/32101* (2013.01); *G06F 3/0486* (2013.01); *G06F 3/04812* (2013.01); *G06V 30/1456* (2022.01)

(58) Field of Classification Search
  None
  See application file for complete search history.

(56) References Cited

U.S. PATENT DOCUMENTS

| | | | |
|---|---|---|---|
| 9,916,316 B2 | 3/2018 | Tokita | |
| 11,477,332 B2 | 10/2022 | Tokita | |
| 2006/0026523 A1* | 2/2006 | Kitamaru | G06F 3/0481 715/708 |
| 2019/0065451 A1* | 2/2019 | Miyamoto | G06V 30/414 |
| 2019/0065843 A1* | 2/2019 | Matsumoto | G06V 30/416 |
| 2019/0102385 A1* | 4/2019 | Tokita | G06F 16/164 |
| 2019/0197303 A1* | 6/2019 | Kanada | H04N 1/00413 |
| 2021/0012137 A1* | 1/2021 | Kumahashi | H04N 1/00411 |
| 2021/0303895 A1* | 9/2021 | Soga | G06N 5/04 |
| 2021/0306478 A1* | 9/2021 | Tokita | H04N 1/00411 |
| 2021/0314449 A1* | 10/2021 | Tokita | H04N 1/0044 |
| 2023/0007132 A1 | 1/2023 | Tokita | |

FOREIGN PATENT DOCUMENTS

JP   2021-140328 A   9/2021

* cited by examiner

*Primary Examiner* — Dung D Tran
(74) *Attorney, Agent, or Firm* — VENABLE LLP

(57) ABSTRACT

On a user interface screen for a user to set a rule relating to property information used for filing a document image and distributing the document image into a folder, at least a first area for editing the rule, a second area displaying a plurality of items selectable by a user, and a third area displaying an image of a sample document are provided. Then, in a case where a particular item being displayed in the second area is activated by a mouse hover, a character area in the image of the sample document being displayed in the third area is highlighted, which corresponds to the particular item activated by the mouse hover.

10 Claims, 18 Drawing Sheets

FIG.6

Storage Destination Folder Rule

☐ Storage destination folder rule:
[ Drop here ~610 ]

System token
[ display name of login user ] [ device name ] [ date (day) ] [ time (hour) ] [ time (minute) ] [ time (second) ]
[ date (year) ] [ date (month) ]

Delimiter
[ underscore ] [ hyphen ] [ space ]

Automatic extraction token
[ title ] [ document creation date ] [ document number ] [ company name (issue destination) ] [ person's name (issue destination) ]
[ company name (issuer) ] [ person's name (issuer) ] [ amount ]

Estimate Form
Estimate number : R12-3500
Date of issue : 2017/09/29
Kosugi Inc.
Taro Yamada
〒100-0000
B-B-B, Ohota-ku, Tokyo 〒100-9999
A-A-A, Ohta-ku, Tokyo
Shimomaruko Inc.
To Ichiro Suzuki

| Item | Unit price | Quantity | Amount |
|---|---|---|---|
| cartridge | 10000 | 1 | 10000 |
| A4 sheet | 3000 | 5 | 15000 |
| A3 sheet | 5000 | 3 | 15000 |
| | | Total | 40000 |

600
605
606
Store    Back 601
602
603
604

Storage Destination Folder Rule — 600

Storage destination folder rule: 702
Drop here — 710
Drop here — 711

System token — 701
- display name of login user
- device name
- date (day)
- date (month)
- date (year)
- time (hour)
- time (minute)
- time (second)

Delimiter
- underscore
- hyphen
- space

Automatic extraction token
- title
- document creation date
- document number
- company name (issue destination)
- person's name (issue destination)
- company name (issuer)
- person's name (issuer)
- amount

---

Estimate Form — 605

〒100-9999
A-A-A, Ohta-ku, Tokyo
Shimomaruko Inc.
To Ichiro Suzuki

Estimate number : R12-3500
Date of issue : 2017/09/29
Kosugi Inc.
Taro Yamada
〒100-0000
B-B-B, Ohota-ku, Tokyo

| Item | Unit price | Quantity | Amount |
|---|---|---|---|
| cartridge | 10000 | 1 | 10000 |
| A4 sheet | 3000 | 5 | 15000 |
| A3 sheet | 5000 | 3 | 15000 |
| | | Total | 40000 |

Store — 606    Back

FIG.7

Storage Destination Folder Rule — 600

601: Storage destination folder rule: 702 801 {space} 802 device name 810 Drop here
  803 {date (year)} Drop here 811
  Drop here 812

605: Estimate Form
〒100-9999
A-A-A, Ohta-ku, Tokyo
Shimomaruko Inc.
To Ichiro Suzuki Estimate number : R12-3500
Date of issue : 2017/09/29
Kosugi Inc.
Taro Yamada
〒100-0000
B-B-B, Ohota-ku, Tokyo

| Item | Unit price | Quantity | Amount |
|---|---|---|---|
| cartridge | 10000 | 1 | 10000 |
| A4 sheet | 3000 | 5 | 15000 |
| A3 sheet | 5000 | 3 | 15000 |
|  |  | Total | 40000 |

602: System token
{display name of login user} {device name} {time (hour)} {time (minute)} {time (second)}
{date (year)} {date (month)} {date (day)}

603: Delimiter
{underscore} {hyphen} {space}

604: Automatic extraction token
{title} {document creation date} {document number} {company name (issue destination)} {person's name (issue destination)}
{company name (issuer)} {person's name (issuer)} {amount}

606: Store | Back

FIG.8

Storage Destination Folder Rule

☐ Storage destination folder rule:

[ 📄 Drop here ]

Estimate Form

〒100-9999
A-A-A, Ohta-ku, Tokyo
Shimomaruko Inc. 901 ~ [Kosugi Inc]
To Ichiro Suzuki Estimate number : R12-3500
Date of issue : 2017/09/29
Taro Yamada
〒100-0000
B-B-B, Ohota-ku, Tokyo

| Item | Unit price | Quantity | Amount |
|---|---|---|---|
| cartridge | 10000 | 1 | 10000 |
| A4 sheet | 3000 | 5 | 15000 |
| A3 sheet | 5000 | 3 | 15000 |
| | | Total | 40000 |

System token

[ :: display name of login user ] [ :: device name ] [ :: time (hour) ] [ :: time (minute) ] [ :: time (second) ]

[ :: date (year) ] [ :: date (month) ] [ :: date (day) ]

Delimiter

[ :: underscore ] [ :: hyphen ] [ :: space ]

Automatic extraction token

[ :: title ] [ :: document creation date ] [ :: document number ] [ :: company name (issue destination) ] [ :: person's name (issue destination) ]

[ :: company name (issuer) ] [ :: person's name (issuer) ] [ :: amount ]

[ Store ]   [ Back ]

Storage Destination Folder Rule

Storage destination folder rule:

[Adding...] ~1201

[item 1] 1202 1203 1204

[Store] [Cancel]

System token

[display name of login user] [device name] [time (hour)] [time (minute)] [time (second)]

[date (year)] [date (month)] [date (day)]

Delimiter

[underscore] [hyphen] [space]

Automatic extraction token

[title] [document creation date] [document number] [company name (issue destination)] [person's name (issue destination)]

[company name (issuer)] [person's name (issuer)] [amount]

601

---

Estimate Form

〒100-9999　　　　　　　Estimate number : R12-3500
A-A-A, Ohta-ku, Tokyo　　Date of issue : 2017/09/29
Shimomaruko Inc.　　　　Kosugi Inc.
To Ichiro Suzuki　　　　　Taro Yamada
　　　　　　　　　　　　〒100-0000
　　　　　　　　　　　　B-B-B, Ohota-ku, Tokyo

| Item | Unit price | Quantity | Amount |
|---|---|---|---|
| cartridge | 10000 | 1 | 10000 |
| A4 sheet | 3000 | 5 | 15000 |
| A3 sheet | 5000 | 3 | 15000 |
| | | Total | 40000 |

[Store] [Back]

FIG.12

Storage Destination Folder Rule

☐ Storage destination folder rule:

[ item 1 ] ~1301

System token

[ display name of login user ] [ device name ] [ time (hour) ] [ time (minute) ] [ time (second) ]

[ date (year) ] [ date (month) ] [ date (day) ]

Delimiter

[ underscore ] [ hyphen ] [ space ]

Automatic extraction token

[ title ] [ document creation date ] [ document number ] [ company name (issue destination) ] [ person's name (issue destination) ]

[ company name (issuer) ] [ person's name (issuer) ] [ amount ]

---

Estimate Form

Estimate number : R12-3500
Date of issue : 2017/09/29
〒100-9999                    Kosugi Inc.
A-A-A, Ohta-ku, Tokyo        Taro Yamada
Shiromaruko Inc.             〒100-0000
To Ichiro Suzuki             B-B-B, Ohota-ku, Tokyo

| Item | Unit price | Quantity | Amount |
|------|------------|----------|--------|
| cartridge | 10000 | 1 | 10000 |
| A4 | 3000 | 5 | 15000 |
| A3 | 5000 | 3 | 15000 |
|  |  | Total | 40000 |

[ Store ]   [ Back ]

Storage Destination Folder Rule

/{display name of login user}{device name} / date (year)  ~1401
Example : / Taro Yamada 17F south side device / 2021 ~1402

INFORMATION PROCESSING APPARATUS, CONTROL METHOD OF INFORMATION PROCESSING APPARATUS, AND STORAGE MEDIUM

BACKGROUND

Field

The present disclosure relates to a technique to set a rule at the time of distributing a file in a folder.

Description of the Related Art

Conventionally, in an information processing apparatus, such as an MFP (Multifunction Peripheral), a method is utilized widely, which files (computerizes) image data obtained by scanning a document, received data of a facsimile or the like and stores it in a storage server on a network by transmitting it thereto. Then, at the time of storing filed data, automatic distribution of filed data in a folder is also performed. For example, Japanese Patent Laid-Open No. 2021-140328 has disclosed a technique to perform generation of a file name automatically in accordance with a file naming rule that is set in advance. Here, it is assumed that a file naming rule is set, which specifies to connect "document type" and "company name" with "underscore", in the technique of Japanese Patent Laid-Open No. 2021-140328. In this case, on a condition that a character string of "Estimate Form" representing "document type" and a character string of "AA Company" representing "company name" are extracted from image data obtained by scanning an estimate form, "Estimate Form_AA Company" is generated as a file name.

Generally, in a business form, such as an estimate form and a bill, a plurality of document numbers and amounts may be included. Here, it is assumed that a user desires to set a file naming rule using attributes, such as "document number" and "amount", by using the technique of Japanese Patent Laid-Open No. 2021-140328 described above. In this case, a user has trouble determining whether "document number" and "amount" supposed by the user him/herself are automatically extracted appropriately. Further, in a case where an engineer or the like sets a file naming rule in place of a user, on a condition that the engineer or the like is not well versed in the business contents of the user (client), it is difficult to select an appropriate attribute by relying on only technical terminology, for example, such as medical terms and legal terms.

SUMMARY

An object of the technique of the present disclosure is to make it possible for a user to set a folder distribution rule and a file naming rule more simply at the time of filing and storing data of a scanned image of a document, a received facsimile and the like.

The information processing apparatus according to the present disclosure is an information processing apparatus including: one or more memories storing instructions; and one or more processors executing the instructions to: perform display control of a rule setting screen for a user to set a rule relating to property information used for distributing a file of a document image into a folder, wherein on the rule setting screen, at least a first area for editing the rule, a second area displaying a plurality of items selectable by a user, and a third area displaying an image of a sample document exist, each of the plurality of items is an element for a user to set a character string configuring the property information, the plurality of items includes: a general item corresponding to a character string with a predetermined attribute; and a particular item for automatically extracting a character string from the document image, which corresponds to an attribute that a user can set arbitrarily, the rule is created by at least one item selected from the second area by a user being arranged at a predetermined position in the first area, which is designated by the user, and in the display control, in a case where the particular item being displayed in the second area is activated by a mouse hover, a character area in the image of the sample document being displayed in the third area is highlighted, which correspond to the particular item activated by the mouse hover.

Further features of the present disclosure will become apparent from the following description of exemplary embodiments with reference to the attached drawings.

BRIEF DESCRIPTION OF THE DRAWINGS

FIG. 6 is a diagram showing an example of a folder distribution rule setting screen;

FIG. 7 is a diagram showing an example of a folder distribution rule setting screen;

FIG. 8 is a diagram showing an example of a folder distribution rule setting screen;

FIG. 9 is a diagram showing an example of a folder distribution rule setting screen;

FIG. 10 is a diagram showing an example of a folder distribution rule setting screen;

FIG. 11 is a diagram showing an example of a folder distribution rule setting screen;

FIG. 12 is a diagram showing an example of a folder distribution rule setting screen;

FIG. 13 is a diagram showing an example of a folder distribution rule setting screen;

FIG. 14 is a diagram showing an example of a folder distribution rule check screen;

FIG. 15 is a diagram showing an example of a file naming rule setting screen;

FIG. 16 is a diagram showing an example of a property setting screen;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

System Configuration

First Embodiment

Figure 1:
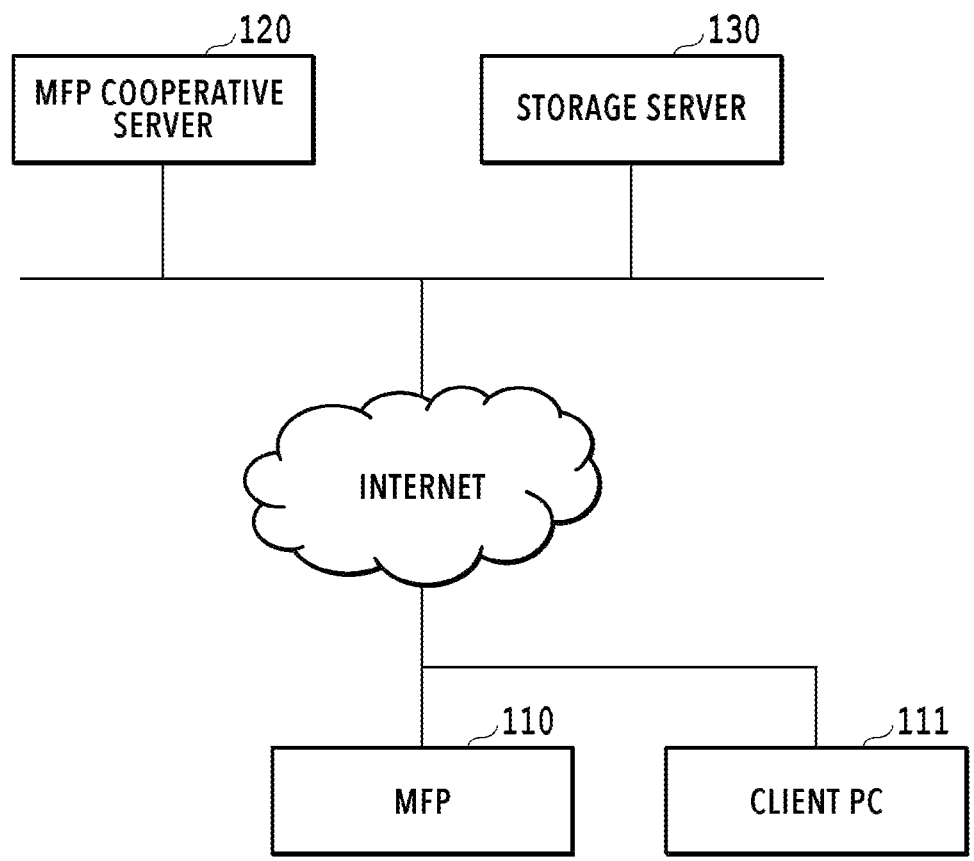
FIG. 1 is a diagram showing a general configuration of an image processing system.

FIG. 1 is a diagram showing the general configuration of an information processing system according to the present embodiment. The information processing system includes an MFP (Multifunction Peripheral) 110, a client PC 111, and server apparatuses 120 and 130 that provide cloud services on the internet. The MFP 110 and the client PC 111 are connected so as to be capable of communicating with various devices that provide various services on the internet via a LAN (Local Area Network).

The MFP 110 is an example of an information processing apparatus having the scan function. The MFP 110 is a multifunction peripheral having a plurality of functions, such as the print function and the BOX store function, in addition to the scan function. The client PC 111 is an information processing apparatus, such as a desktop terminal and a mobile terminal, capable of receiving the provision of cloud services via the internet. Both the server apparatuses 120 and 130 are each an information processing apparatus providing cloud services. The server apparatus 120 of the present embodiment provides cloud services to perform an image analysis for a scanned image received from the MFP 110, transfer a request from the MFP 110 to the server apparatus 130 providing other services, and so on. In the following, the cloud service provided by the server apparatus 120 is called "MFP cooperative service". The server apparatus 130 provides cloud services (in the following, called "storage services") to store file data that is sent via the internet in a predetermined folder, provide a stored file in response to a request from a web browser of the client PC 111, and so on. In the present embodiment, the server apparatus 120 that provides the MFP cooperative service is called "MFP cooperative server" and the server apparatus 130 that provides the storage service is called "storage server".

The information processing system of the present embodiment has the configuration including the MFP 110, the client PC 111, the MFP cooperative server 120, and the storage server 130, but the configuration is not limited to this. For example, the MFP 110 may also play the role of the client PC 111 and the MFP cooperative server 120. Further, the MFP cooperative server 120 may be arranged on the LAN in place of on the internet. Furthermore, the storage server 130 may be replaced with a mail server or the like and applied to a scene in which a scanned image of a document is transmitted by being attached to a mail.

<Hardware Configuration of MFP 110>

Figure 2:
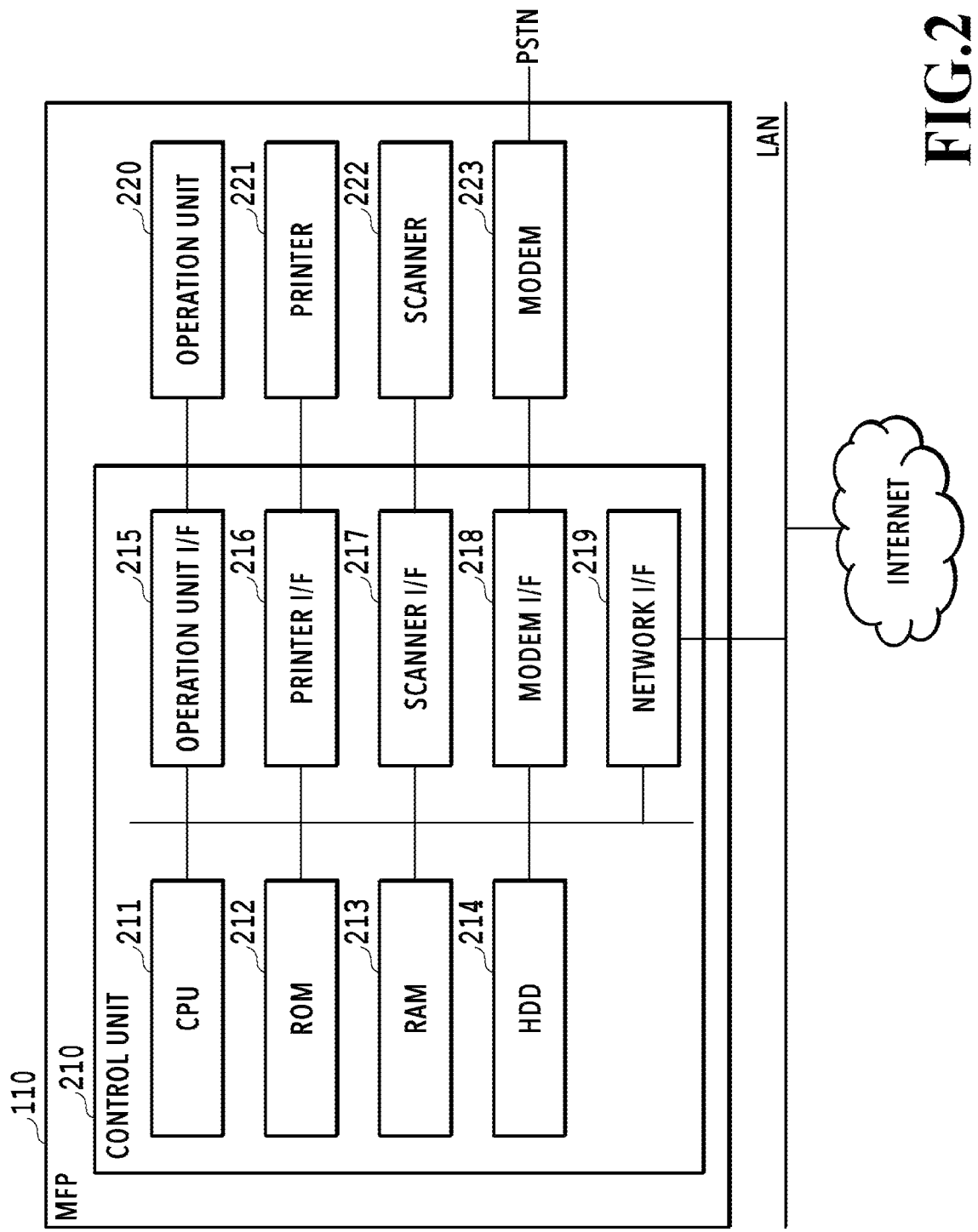
FIG. 2 is a block diagram showing a hardware configuration of an MFP.

FIG. 2 is a block diagram showing the hardware configuration of the MFP 110. The MFP 110 includes a control unit 210, an operation unit 220, a printer 221, a scanner 222, and a modem 223. The control unit 210 includes each of units 211 to 219 below and controls the operation of the entire MFP 110. The CUP 211 reads and executes control programs (programs corresponding to various functions shown in a software configuration diagram, to be described later) stored in the ROM 212. The RAM 213 is used as a temporary storage area, such as a main memory and a work area, of the CPU 211. In the present embodiment, the one CPU 211 performs each piece of processing shown in flowcharts, to be described later, by using the one memory (RAM 213 or HDD 214), but the present embodiment is not limited to this. For example, it may also be possible to perform each piece of processing by causing a plurality of CPUs and a plurality of RAMs or HDDs to cooperate with one another.

The HDD 214 is a large-capacity storage unit configured to store image data and various programs. The operation unit I/F 215 is an interface that connects the operation unit 220 and the control unit 210. The operation unit 220 comprises a touch panel, a keyboard and the like and receives operations/inputs/instructions by a user. The touch operation to the touch panel includes the operation with a human finger and the operation with a touch pen. The printer I/F 216 is an interface that connects the printer 221 and the control unit 210. Image data to be printed is transferred from the control unit 210 to the printer 221 via the printer I/F 216 and printed on a printing medium.

The scanner I/F 217 is an interface that connects the scanner 222 and the control unit 210. The scanner 222 generates scanned image data by optically reading a document that is set on a document table or ADF (Auto Document Feeder), not shown schematically, and inputs the scanned image data to the control unit 210 via the scanner I/F 217. It is possible to print (copy and output) the scanned image data generated by the scanner 222 in the printer 221, store the data in the HDD 214, transmit the data to an external apparatus, such as the MFP cooperative server 120, as a file or a mail via a LAN, and so on. The modem I/F 218 is an interface that connects the modem 223 and the control unit 210. The modem 223 performs facsimile communication of image data with a facsimile device (not shown schematically) on the PSTN. The network I/F 219 is an interface that connects the control unit 210 (MFP 110) to a LAN. The MFP 110 transmits image data and information to each service on the internet, receives various kinds of information, and so on, by using the network I/F 219. The hardware configuration of the MFP 110 explained above is an example and the hardware configuration may be one that comprises another configuration as needed or may be one that does not have part of the configuration.

<Hardware Configuration of Client PC and Server Apparatus>

Figure 3:
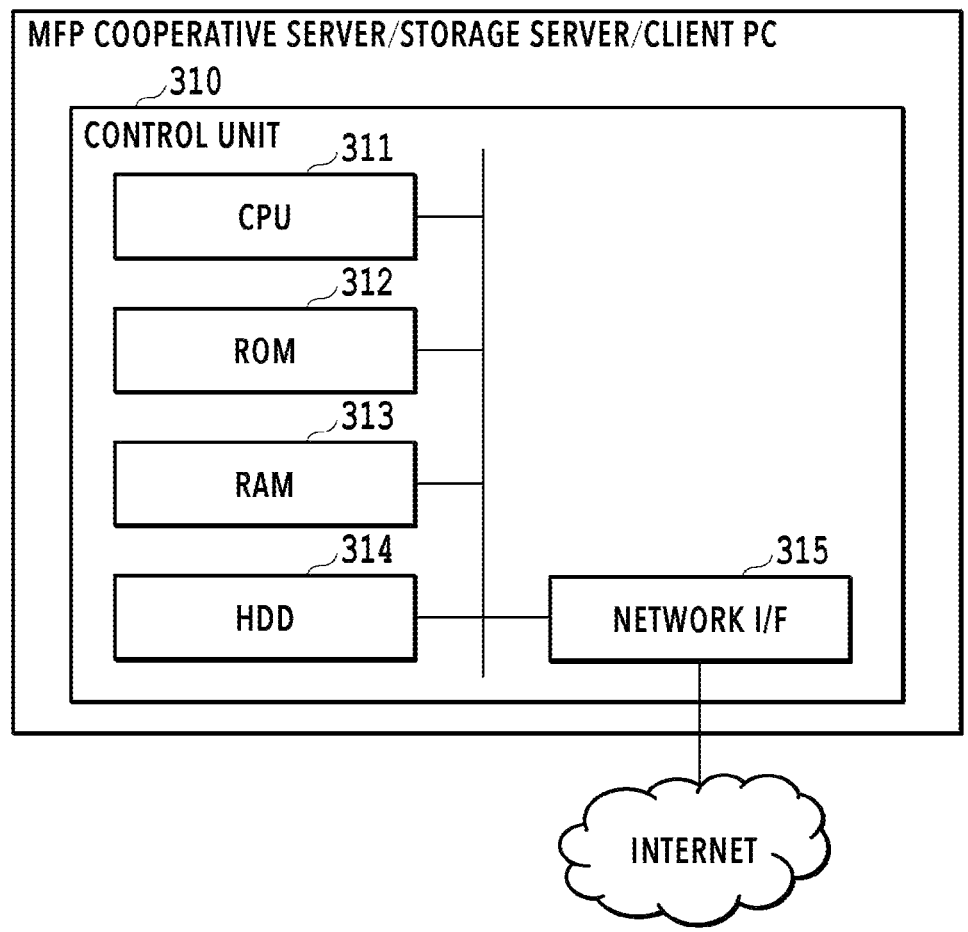
FIG. 3 is a block diagram showing a hardware configuration of an MFP cooperative server and a storage server.

FIG. 3 is a block diagram showing the hardware configuration of the client PC 111, the MFP cooperative server 120, and the storage server 130. The client PC 111, the MFP cooperative server 120, and the storage server 130 include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects the client PC 111/the MFP cooperative server 120/the storage server 130 to the internet. The MFP cooperative server 120 and the storage server 130 receive requests for various kinds of processing from other apparatuses (MFP 110, client PC 111 and the like) via the network I/F 315 and return processing results in accordance with the requests.

<Software Configuration of Information Processing System>

Figure 4:
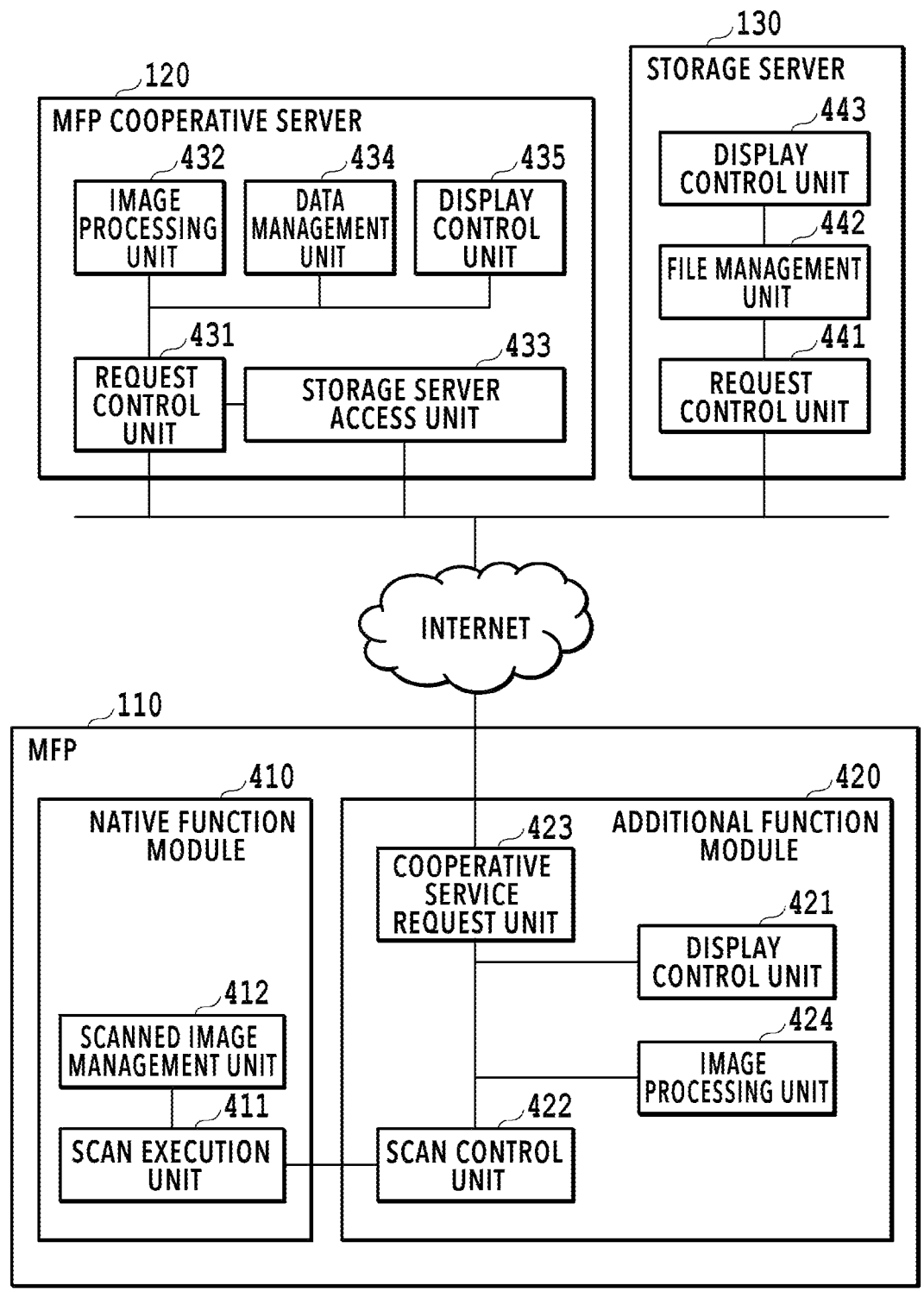
FIG. 4 is a block diagram showing a software configuration of the image processing system.

FIG. 4 is a block diagram showing the software configuration of the information processing system according to the present embodiment. In the following, the software configuration corresponding to the role of each of the MFP 110, the MFP cooperative server 120, and the storage server 130 is explained in order. In the following, explanation is given by narrowing the various functions of each apparatus to the functions relating to the processing from filing a scanned image obtained by scanning a document in the MFP 110 until storing it in the storage server 130 via the MFP cooperative server 120.

<<Software Configuration of MFP>>

The function modules of the MFP 110 are roughly divided into two modules, that is, a native function module 410 and an additional function module 420. While the native function module 410 is an application provided as a standard one in the MFP 110, the additional function module 420 is an application that is installed additionally in the MFP 110. The additional function unit 420 is an application based on Java (registered trademark) and it is possible to easily implement the addition of a function to the MFP 110. In the MFP 110, another additional application, not shown schematically, may be installed.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (UI screen) for receiving various user operations on a touch panel of the operation unit 220. The various user operations include, for example, input of login authentication information for accessing the MFP cooperative server 120, scan setting, setting of a rule relating to folder distribution and file naming, giving instructions to start a scan, giving instructions to store a file and the like.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is stored in the HDD 214 by the scanned image management unit 412. At this time, the scan control unit 422 is notified of information on a scanned image identifier uniquely indicating the stored scanned image data. The scanned image identifier is a number, symbol, alphabetical letter and the like for uniquely identifying the image scanned in the MFP 110. The scan control unit 422 obtains, for example, the scanned image data that is the target to be filed from the scanned image management unit 412 by using the above-described scanned image identifier. Then, the scan control unit 422 instructs the cooperative service request unit 423 to make a request for processing necessary to file the scanned image data to the MFP cooperative server 120.

The cooperative service request unit 423 makes requests for various kinds of processing to the MFP cooperative server 120, receives responses thereto, and so on. The various kinds of processing include, for example, login authentication, scanned image analysis, transmission of scanned image data and the like. For transmission and reception with the MFP cooperative server 120, the communication protocol, such as REST and SOAP, is used.

The image processing unit 424 generates an image that is used on the UI screen displayed by the display control unit 421 by performing predetermined image processing for the scanned image data.

<<Software Configuration of Server Apparatus>>

First, the software configuration of the MFP cooperative server 120 is explained. The MFP cooperative server 120 has a request control unit 431, an image processing unit 432, a storage server access unit 433, a data management unit 434, and a display control unit 435. The request control unit 431 stands by in the state of being capable of receiving a request from an external apparatus and instructs the image processing unit 432, the storage server access unit 433, and the data management unit 434 to perform predetermined processing in accordance with received request contents. The image processing unit 432 performs image modification processing, such as rotation and inclination correction, in addition to image analysis processing, such as character area detection processing, character recognition processing, and similar document determination processing, for the scanned image data that is sent from the MFP 110. The storage server access unit 433 makes a request for processing to the storage server 130. The cloud service has made public a variety of interfaces for storing a file in the storage server, obtaining a stored file, and so on by using the protocol, such as REST and SOAP. The storage server access unit 433 makes a request to the storage server 130 by using an interface made public. The data management unit 434 stores and manages user information, various kinds of setting data and the like, which are managed in the MFP cooperative server 120. The display control unit 435 receives a request from a web browser running on the MFP 110 or the client PC 111 connected via the internet and returns screen configuration information (HTML, CSS and the like) necessary for the screen display. It is possible for a user to check the registered user information, change the scan setting and the rule setting relating to folder distribution and file naming via the screen that is displayed on the web browser.

Next, the software configuration of the storage server 130 is explained. The storage server 130 has a request control unit 441, a file arrangement unit 442, and a display control unit 443. The request control unit 441 stands by in the state of being capable of receiving a request from an external apparatus and in the present embodiment, the request control unit 441 instructs the file arrangement unit 442 to store a received file and read a stored file in response to a request from the MFP cooperative server 120. Then, the request control unit 441 returns a response in accordance with the request to the MFP cooperative server 120. The display control unit 443 receives a request from a web browser running on the MFP 110 or the client PC 111 connected via the internet and returns screen configuration information (HTML, CSS and the like) necessary for the screen display. It is possible for a user to check, obtain, and so on a stored file via the screen that is displayed on the web browser.

Although omitted in FIG. 4, it is assumed that the client PC 111 also comprises the same function module as the additional function module 420 described previously.

<Scan Profile>

It is possible to set "folder distribution rule" and "file naming rule", to be described later, for each of various scan workflows. Here, the scan workflow means a series of work to transmit data of a scanned image obtained by scanning a document, such as a business form, to a specific transmission destination (for example, storage server 130) under a specific condition. The condition of each scan workflow and information on the transmission destination are managed by a scan profile. It is possible for a user to simply implement a desired scan workflow by creating a scan profile in advance.

The procedure to create a scan profile is, for example, as follows. First, a user logs in to the MFP cooperative server 120 via the client PC 111 and causes the display to make a transition from a main screen (not shown schematically) that is displayed after the login into a UI screen as shown in FIG.

Figure 5:
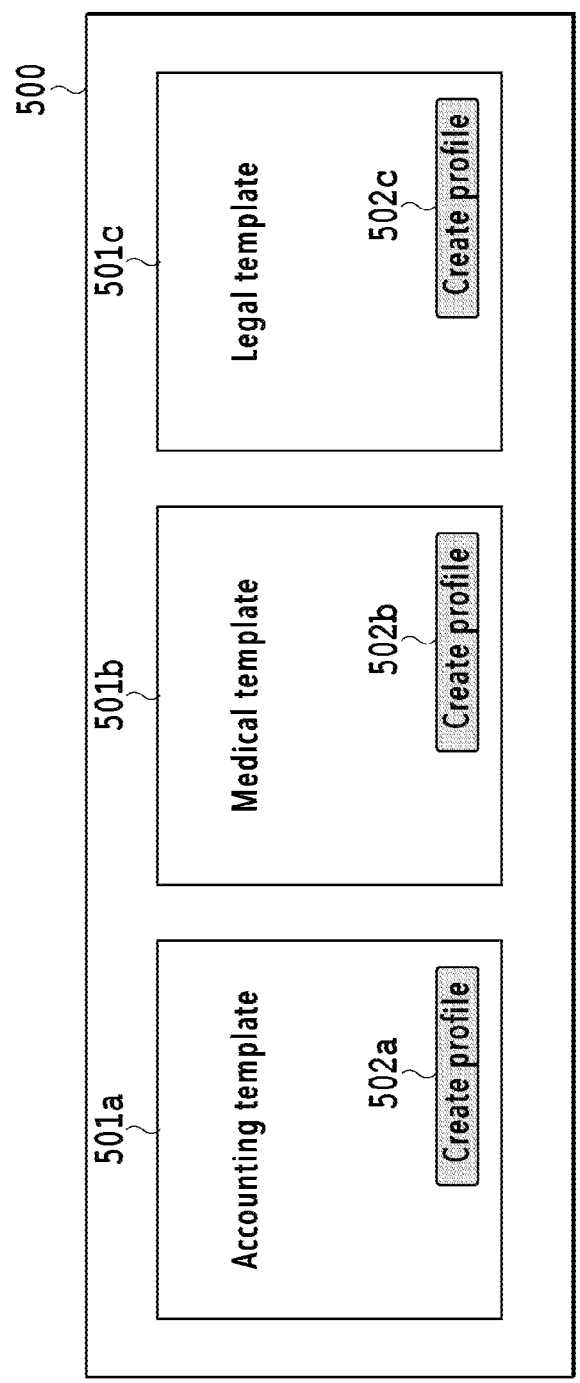
FIG. 5 is a diagram showing an example of a scan template list screen.

5. FIG. 5 shows an example of a UI screen (in the following, called "template selection screen") showing a list of templates for creating a scan profile. On a template selection screen 500, templates 501a to 501c exist. Here, for each type of business, the accounting template 501a, the medical template 501b, and the legal template 501c are shown. It may also be possible to prepare the types of template for each use case, in addition to each type of business. or prepare for each task, or for each storage server. Alternatively, it may also be possible to enable a user to create a profile by customizing all settings without using templates. In a case where a user presses down a "Create profile" button 502 in a desired template, a scan profile setting screen (not shown schematically) is displayed. On the scan profile setting screen, a user performs input for various items of the workflow, such as the type of storage server, which is the transmission destination, the type of output file, the folder distribution rule, and the file naming rule. In a case where a user having completed the necessary input presses down a "Store" button (not shown schematically) within the scan profile setting screen, a scan profile in accordance with input contents is created and stored in, for example, the HDD 214 of the MFP 110. By the scan profile thus stored being displayed on a profile execution screen (not shown schematically) of the MFP 110 and a user selecting a desired scan profile and performing a scan, for example, it is possible to transmit the scanned image to the desired storage server 103 and store it therein.

<Setting of Folder Distribution Rule>

Following the above, the setting of a rule relating to distribution of a file to a storage destination folder in a scene in which a scanned image of a document is filed and stored in the storage server 130 is explained. In the present embodiment, explanation is given on the assumption that various settings including the setting of a folder distribution rule are performed in the client PC 111. The control of the display of various UI screens and the storage of a set rule, to be described below, is implemented by the additional function module 420 described previously comprised by the client PC 111. That is, it is also possible to perform the contents, to be described below, by the MFP 110 comprising the additional function module 420.

FIG. 6 is a diagram showing an example of a UI screen (in the following, called "folder distribution rule setting screen") for a user to set a rule relating to a file distribution destination (storage destination folder), which is displayed on a display (not shown schematically) of the client PC 111. A folder distribution rule setting screen 600 shown in FIG. 6 shows an initial display state and has five areas of a rule editing area 601, a system token area 602, a delimiter token area 603, an automatic extraction token area 604, and a sample document area 605. Then, in the rule editing area 601, a token drop area 610 exists and further, at the bottom of the screen, a "Store" button 606 for determining and storing a set rule exists.

In the present specification, "token" means an item for a user to designate a character string (including symbol) used in property information necessary at the time of storing a file in the storage server 130, while taking the attribute thereof into consideration. Then, the token includes a general token (general item) corresponding to a character string with a predetermined attribute and a particular token (particular item) for a user to automatically extract a character string corresponding to a specific attribute that can be set arbitrarily by a user from within a document. A system token and a delimiter token, to be described later, correspond to the general token and an automatic extraction token, to be described later, corresponds to the particular token. These tokens are represented as a UI element that is a target of the user operation, such as the drag operation and the drop operation, on various setting screens that appear in the following.

In the system token area 602, the delimiter token area 603, and the automatic extraction token area 604, various tokens are displayed in a list. Then, in the rule editing area 601, a folder distribution rule created by using various tokens is displayed. Here, the folder distribution rule includes information relating to the folder path of the scanned data distribution destination (storage destination folder) and the folder hierarchy structure and is set in advance by a user.

<<Setting of Token>>

It is possible for a user to select one of tokens displayed in the system token area 602, the delimiter token area 603, and the automatic extraction token area 604 by the drag operation and perform the drop operation to drop the selected token in the token drop area 610. As a result of that, a new folder is represented in a pseudo manner, which includes a character string corresponding to the token selected by the drag operation as the folder name (folder path).

The system token area 602 is an area in which tokens are displayed, which take the environmental variable of a user, such as "display name of login user", "time", and "date", as the attribute value. The delimiter token area 603 is an area in which tokens are displayed, which take the delimiter (symbol), such as "underscore" and hyphen", as the attribute value. The automatic extraction token area 604 is an area in which tokens are displayed, which take the character string corresponding to the attribute type in OCR results (recognized character string) of a scanned image as the attribute value. Details of the automatic extraction token, such as the attribute type selectable in the automatic extraction token, will be described later.

The information on the rule displayed in the rule editing area 601 is transmitted to the MFP cooperative server 120 in response to the pressing down of the "Store" button 606 and managed by the data management unit 434. Further, in a case where the "Back" button is pressed down, the rule being displayed in the rule editing area 601 is discarded and the setting processing terminates.

Here, the storage destination folder distribution rule in the present embodiment is reviewed. First, it is assumed that no restrictions are imposed particularly on the combination and order of tokens that can be set as the folder distribution rule. For example, it may also be possible to create a rule that one folder name should consist of only the delimiter tokens in the delimiter token area 603, or it is also possible to create a rule that the same system token should be used.

FIG. 7 shows the state of the folder distribution rule setting screen 600 in a case where a user drags and drops an arbitrary system token within the system token area 602 in the rule editing area 601. Specifically, FIG. 7 shows the state in a case where a system token 701 among a plurality of system tokens displayed within the system token area 602 is dropped in the token drop area 610, which takes "display name of login user" as the attribute name. Turning to the rule editing area 601 in FIG. 7, a token 702 whose attribute name is "display name of login user" is newly arranged at the position of the token drop area 610 (see FIG. 6) at which a user has performed the drop operation and at the same time, new token drop areas 710 and 711 are generated. In the state shown in FIG. 7, in a case where a user selects one token from the token groups existing in the various token areas 602 to 604 described above and drags and drops it in the token drop area 710 or 711, a new token drop area is further generated (not shown schematically). Then, in a case where a user further drags and drops an arbitrary token in the newly generated token drop area, a token drop area is further generated. The state of the folder distribution rule setting screen 600 after the operation such as this is performed repeatedly is shown in FIG. 8. Turning to the rule editing area 601 in FIG. 8, two new tokens (a token 801 whose attribute name is "{space}" and a token 802 whose attribute name is "device name") are added and a token drop area 810 is further generated. In this case, the three tokens 702, 801, and 802 are set to the folder name of the folder in the first hierarchy (the uppermost hierarchy). In accordance with the example in FIG. 8, the folder whose folder path is "(display name of login user) (device name)" is created as the folder in the uppermost hierarchy. On the other hand, also in a case where a user drags and drops one arbitrary token in the token drop area 711 existing in the second hierarchy in the rule editing area 601 shown in FIG. 7, a new token drop area is further generated. Turning to the rule editing area 601 in FIG. 8, a token 803 of "date (year)" is added and two token drop areas 811 and 812 are further generated. The token drop area 811 is used in a case where a new token is added to the folder in the second hierarchy for which the use of the token 803 is already determined. Further, the token drop area 812 is used in a case where a first token is set to the folder in the third hierarchy.

As is obvious from the explanation so far, the hierarchy of the folder that uses the three tokens 702, 801, and 803 as the folder name is different from the hierarchy of the folder that uses the token 803 as the folder name. That is, in the folder structure, the folder that uses the token 803 as the folder name exists in the lower layer of the folder that uses the three tokens 702, 801, and 802 as the folder name. Even for the tokens set in the rule editing area 601 as described above, by the drag operation, it is possible to change the arrangement by exchanging the tokens adjacent to each other, inserting a token between tokens, and so on.

<<Deletion of Token>>

Following the above, a case is explained where a user deletes the token in each folder hierarchy, which is set as described above. In a case where a user performs the mouse-hover operation for one of the tokens being displayed in the rule editing area 601, a "x" button is displayed on the token (not shown schematically). It is possible for a user to delete the token by pressing down the "x" button.

<<Automatic Extraction Token>>

Following the above, the automatic extraction token is explained, which is one of the features of the present embodiment. The attribute of the automatic extraction token, which represents the type of attribute, changes in accordance with the type of template selected at the time of the scan profile creation described previously. For example, in the automatic extraction token area 604 in FIG. 6 to FIG. 8 described previously, eight tokens are displayed whose attribute names are "title", "document creation date", "document number", "company name (issue destination)", "person's name (issue destination)", "company name (issuer)", "person's name (issuer)", and "amount". These are the automatic extraction tokens associated with the accounting template taking an estimate form, a bill and the like as a target. In a case where the legal template is selected, "client name", "case number" and the like are displayed and in a case where the medical template is selected, "patient's name", "date of birth" and the like are displayed and in this manner, tokens having attribute names in accordance with the selected template are displayed.

<<Display of Sample Document>>

Next, the display of a sample document is explained, which is one of the features of the present embodiment. The image of a sample document that is displayed in the sample document area 605 also changes in accordance with the template selected at the time of the scan profile creation described previously. For example, in the sample document area 605 in FIG. 6 to FIG. 8 described previously, as an example of a sample document relating to accounting in a case where the accounting template is selected, the image of "Estimate Form" is displayed. In a case where the legal template is selected, the image of "Judicial Document" in which a plaintiff, a defendant, and a judgment document are recorded is displayed and in a case where the medical template is selected, the image of "Medical Sheet" in which a patient's name and a symptom are described is displayed as the image of each sample document. Further, although not shown schematically on the folder distribution rule setting screen 600 in FIG. 6 to FIG. 8, it may also be possible to provide a "Switch" button at the bottom of the sample document so as to make it possible to switch the image, for example, from "Estimate Form" to "Bill" by pressing down this button. Furthermore, although not shown schematically on the folder distribution rule setting screen 600 in FIG. 6 to FIG. 8, it may also be possible to provide an "Import" button at the bottom of the sample document. It may also be possible to enable a user to upload the image of an arbitrary business form and the like and display the image as a sample document by pressing down "Import" button.

<<Relationship Between Automatic Extraction Token and Sample Document>>

FIG. 9 shows the state of the folder distribution rule setting screen 600 in a case where a user performs the mouse-hover operation for one of a plurality of tokens displayed in the automatic extraction token 604. In the example in FIG. 9, a character area 901 of "Kosugi Inc." on the sample document is highlighted, which corresponds to the token of the attribute name "company name (issuer)" activated by a mouse hover. It is possible to implement the display control such as this by creating and storing in advance a table or the like in which the attribute name of an automatic extraction token and the corresponding character area in the image of the sample document are associated with each other and by referring to the table or the like.

Figure 10:
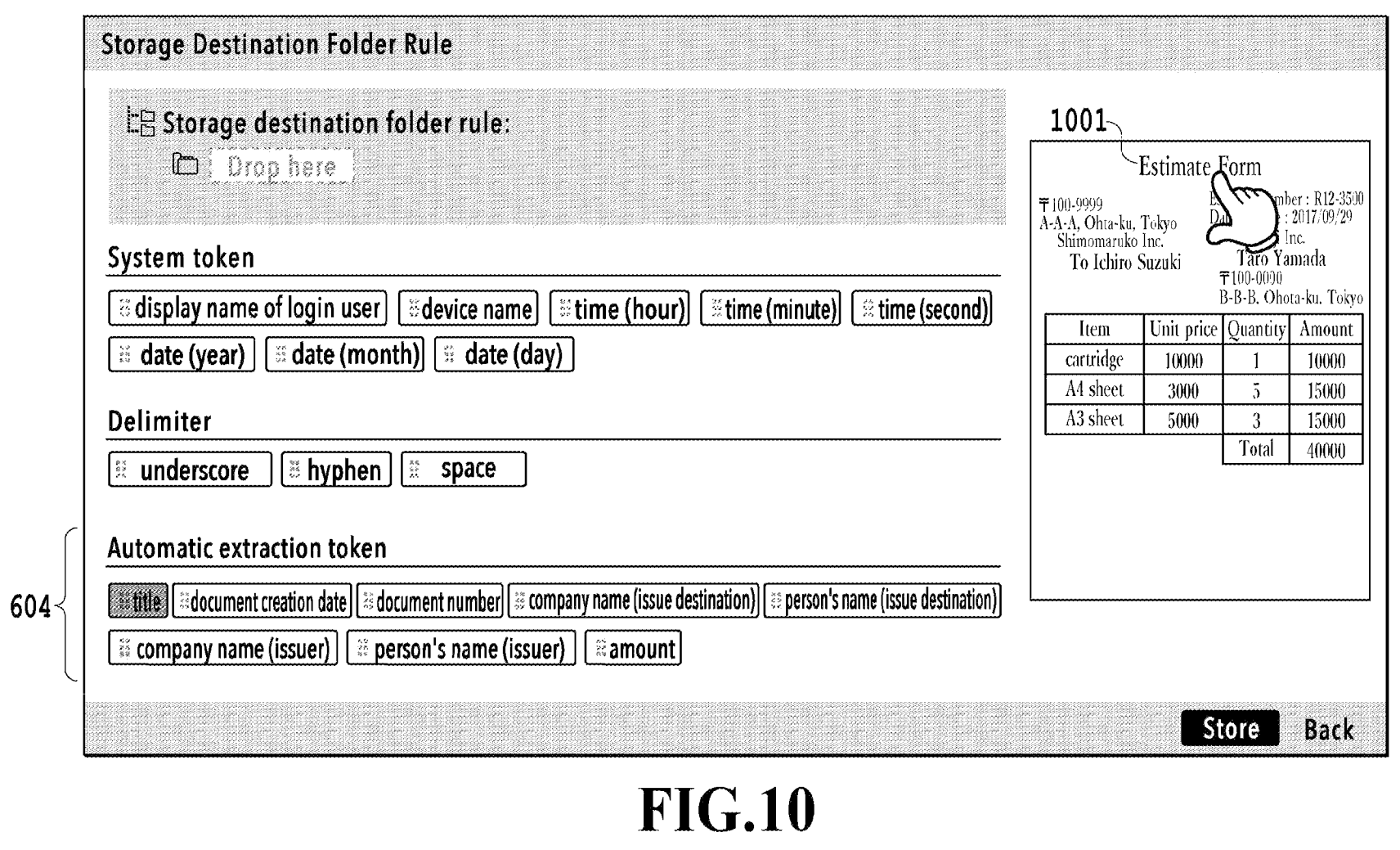
Figure 11:
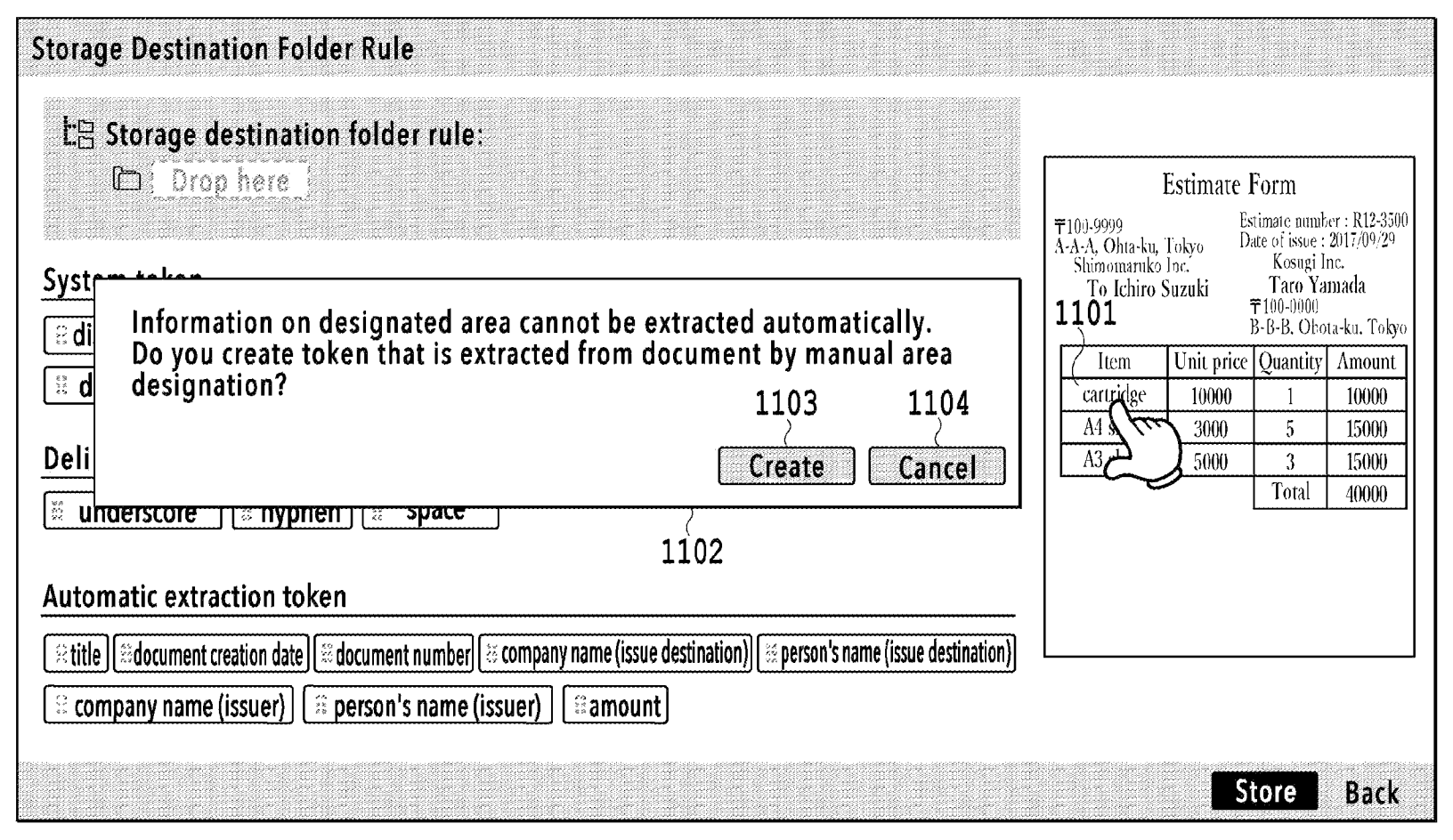

FIG. 10 shows the state of the folder distribution rule setting screen 600 in a case where a user performs the mouse-hover operation for an arbitrary character area on the sample document. In the example in FIG. 10, the automatic extraction token whose attribute type is "title" is highlighted, which corresponds to a character area 1001 activated by a mouse hover of "Estimate Form" on the sample document. At this time, there may be a case where a token corresponding to the character area activated by a mouse hover does not exist in the automatic extraction token area 604. In this case, a user is notified of this by displaying, for example, a warning message. FIG. 11 shows the state of the folder distribution rule setting screen 600 in a case where a user performs the mouse-hover operation for a character area for which no corresponding automatic extraction token exists. Here, for a character area 1101 of "cartridge" on the sample document, no corresponding automatic extraction token exists. Because of this, a warning dialog 1102 is displayed, which includes a message to the effect that the designated area cannot be extracted automatically because the character area 1101 of "cartridge" is activated by a mouse hover. In the present embodiment, a "Create" button 1130 is provided within the warning dialog 1102 so that it is made possible to create a manual extraction token (to be described later) for extracting an arbitrary character string by manual area designation of a user by pressing down this button. A "Cancel" button 1104 within the warning dialog 1102 is used at the time of closing the warning dialog 1102. It is also possible to implement the display control of the warning dialog such as this by creating and storing in advance a table or the like in which each of the attribute types of automatic extraction tokens and the corresponding character area in the image of the sample document are associated with each other and by referring the table or the like.

<<Manual Extraction Token>>

FIG. 12 shows the state of the folder distribution rule setting screen 600 in a case where the "Create" button 1103 of the warning dialog 1102 is pressed down by a user. In a token drop area 1201, a character string of "Adding . . . " is displayed. Further, in a text field 1202 that is displayed as a pop-up field in response to the pressing down of the "Create" button 1103, a character string of "item 1" is input. The character string input to the text field 1202 in this manner is set as the attribute name of the token utilized for the creation of a folder path by the pressing down of a "Store" button 1203 within the rule editing area 601. A "Cancel" button 1204 is used in a case where the setting of a manual extraction token is cancelled. FIG. 13 shows the state of the folder distribution rule setting screen 600 after a manual extraction token is set by a user pressing down the "Store" button 1203. A token 1301 having the character string "item 1" input to the above-described text filed 1202 as the attribute name is displayed as a token for the folder in the first hierarchy within the rule editing area 601. The setting method of a manual extraction token is not limited to the example described above and for example, it may also be possible to enable the setting by selecting an arbitrary character string area within a preview pane 1601 on a property setting screen 1600 shown in FIG. 16, to be described later.

<<Check of Set Folder Distribution Rule>>

FIG. 14 is a diagram explaining how a folder distribution rule created and stored by a user via the folder distribution rule setting screen 600 described previously is displayed on a main screen (not shown schematically). In the example shown in FIG. 14, contents (structure of folder path) 1401 of the created and stored folder distribution rule and a sample 1402 of the folder path in accordance with the contents are displayed. Here, the structure 1401 of the folder path shown in FIG. 14 corresponds to the contents "{display name of login user} {device name}/date (year)" indicated in the rule editing area 601 on the folder distribution rule setting screen 600 in FIG. 8. Then, the contents of the sample 1402 of the folder path that is displayed are "/Taro Yamada 17F south side device/2021" using the character string within the sample document being displayed in the sample document area 605. The slash included in the structure 1401 of the folder path and the sample 1402 thereof represents a separation between folder hierarchies.

<Setting of File Naming Rule>

Figure 15:
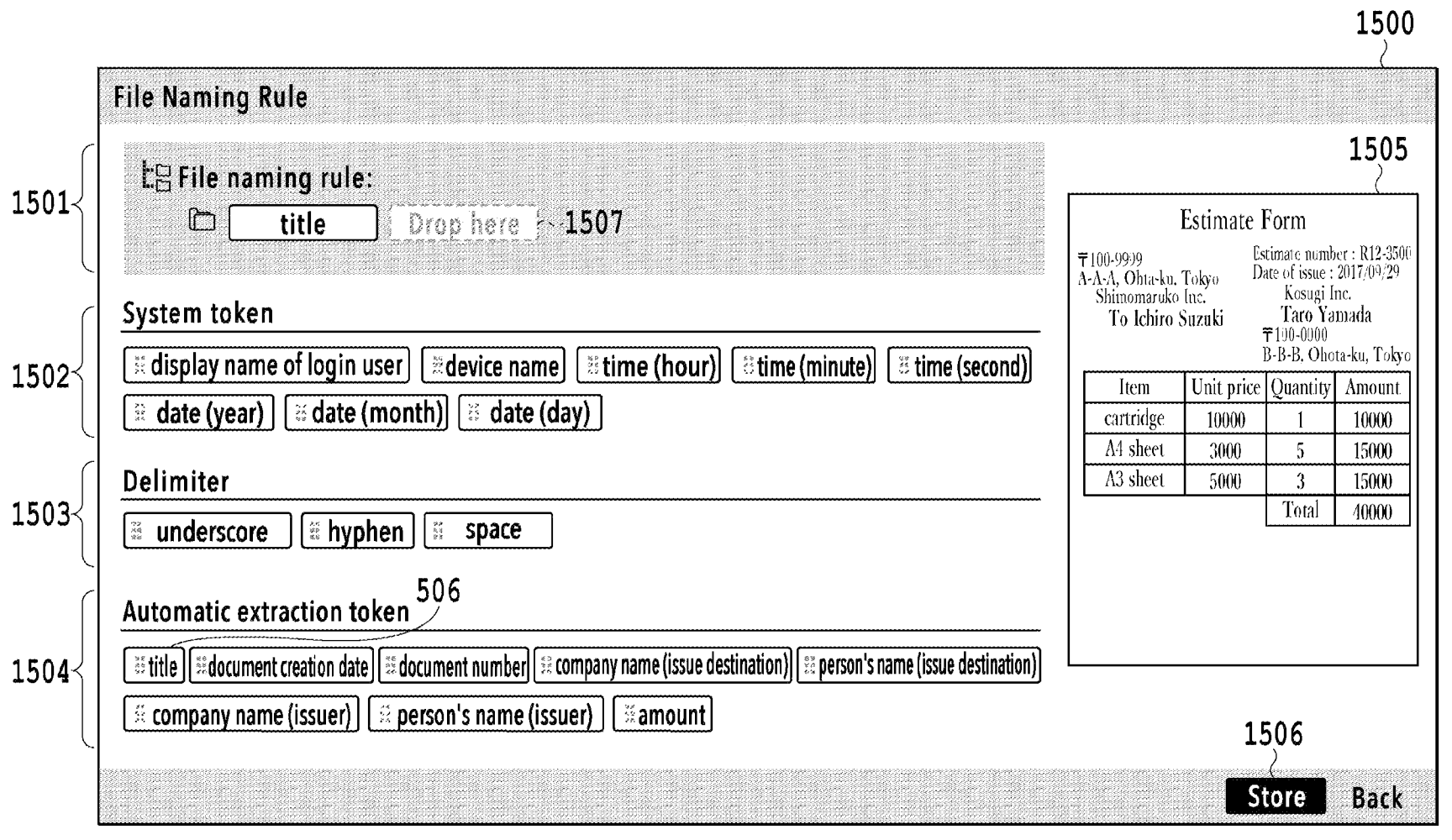

Following the above, the setting of a naming rule relating to a file name that is appended in a case where a scanned image or the like is filed is explained. In the present embodiment, explanation is given by taking a case as an example where the setting of a file naming rule is also performed in the client PC 111. FIG. 15 is a diagram showing an example of a UI screen (in the following, called "file naming rule setting screen") for a user to set a file naming rule, which is displayed on the display (not shown schematically) of the client PC 111. A file naming rule setting screen 1500 shown in FIG. 15 shows the initial display state and has the same screen configuration as that of the folder distribution rule setting screen 600 described previously. That is, the file naming rule setting screen 1500 also has five areas of a rule editing area 1501, a system token area 1502, a delimiter token area 1503, an automatic extraction token area 1504, and a sample document area 1505. Then, in the rule editing area 1501, a token drop area 1507 exists and further, at the bottom on the screen, a "Store" button 1506 for determining and storing a set file naming rule exists. In the following, points different from those of the folder distribution rule setting screen 600 are explained mainly.

The creation of a file naming rule is also performed by arranging various tokens displayed in the system token area 1502, the delimiter token area 1503, and the automatic extraction token area 1504 by drag and drop. The file name does not have a hierarchy structure, and therefore, even in a case where a new token is added to the rule editing area 1501, a plurality of token drop areas is not displayed and this point is different from the folder distribution rule setting screen 600.

One or a plurality of tokens arranged in the rule editing area 1501 is a component or components of a single file name. That is, in a case where a plurality of tokens is set, one file name is generated by connecting the attribute value of each token.

<Property Setting Check at the Time of Filing>

Next, a flow of specific processing in the property setting at the time of filing a scanned image and the like is explained. Here, the property refers to a file name, a folder path, metadata and the like, which are necessary for each piece of filing-target image data. For example, in a case where a certain document is scanned and filed and stored in the storage server 130, a user sets necessary properties via a property setting screen on which the storage destination folder distribution rule and the file naming rule set as described above are reflected.

Figure 16:
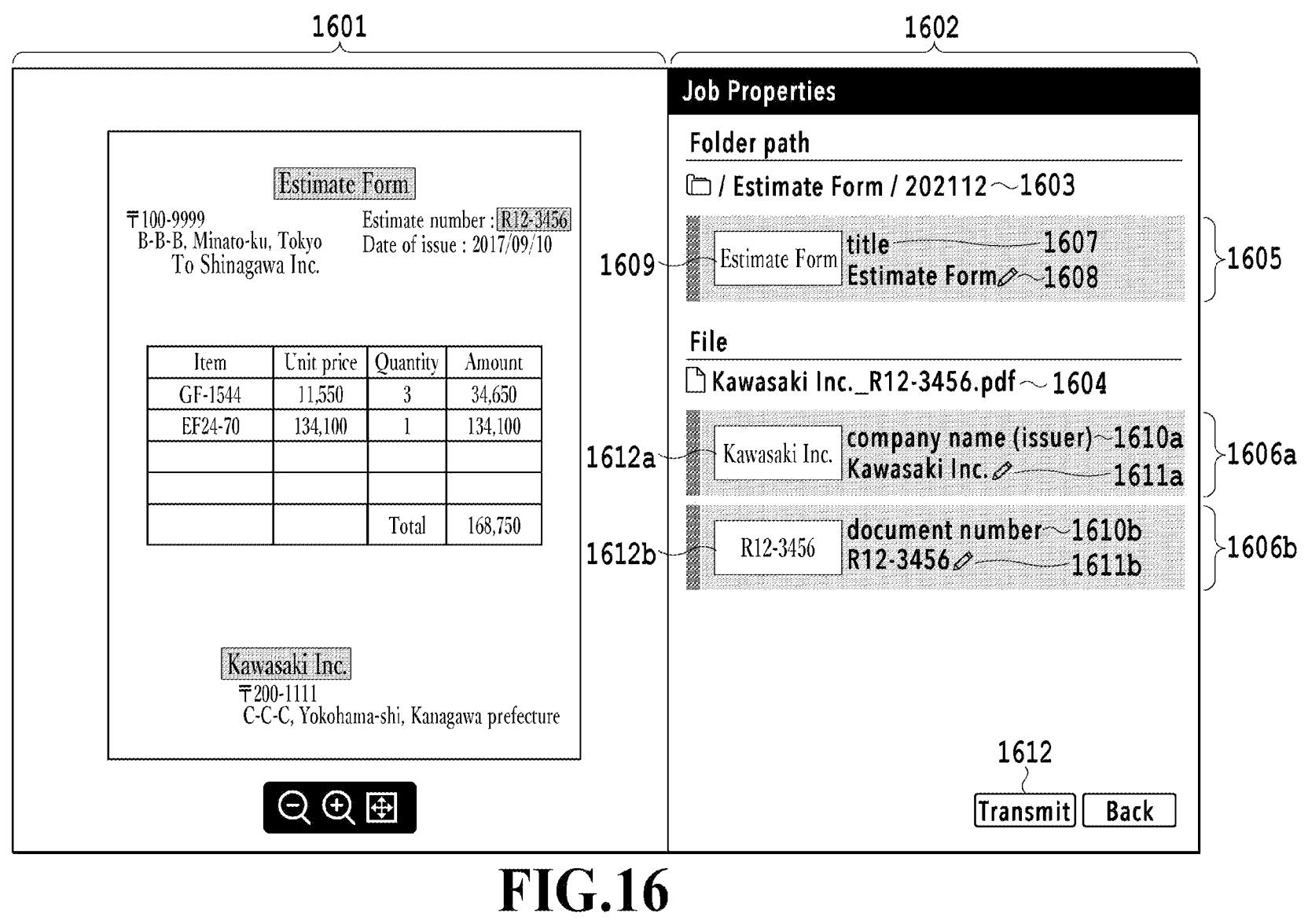

FIG. 16 is a diagram showing an example of a UI screen (in the following, called "property setting screen") for a user to set a property, which is displayed on the display (not shown schematically) of the client PC 111. The property setting screen 1600 shown in FIG. 16 is in the initial display state and has a 2-pane configuration of the preview pane 1601 and a property pane 1602. Here, within the preview pane 1601, a processing-target scanned image of "Estimate Form" is displayed as a preview. In the preview pane 1601, it is possible to display any portion in the scanned image by scrolling and zooming the scanned image. The property pane 1602 is a pane for displaying and editing a property to be appended to a processing-target scanned image. Here, within the property pane 1602, a folder path display area 1603, a file name display area 1604, an attribute value input filed 1605 corresponding to a folder path, and an attribute value input field 1606 corresponding to a file name are displayed. Then, in the attribute value input field 1605, an attribute name 1609 and an attribute value 1608 of an automatic extraction token and a cutout image 1607 corresponding to the attribute value are displayed. In the folder path display area 1603, "/Estimate Form/2012 12" is displayed as a folder path and the displays of the attribute values corresponding to the system tokens of "date (year)" and "date (month)" are omitted. The reason is that the attribute name of a system token is fixed unlike that of an automatic extraction token and there is no possibility that the system makes an error, and therefore, it is not necessary to cause a user to check them. However, it may also be possible to display an attribute value, a cutout image of a corresponding character area and the like for a system token.

<File Transmission Processing>

Figure 17:
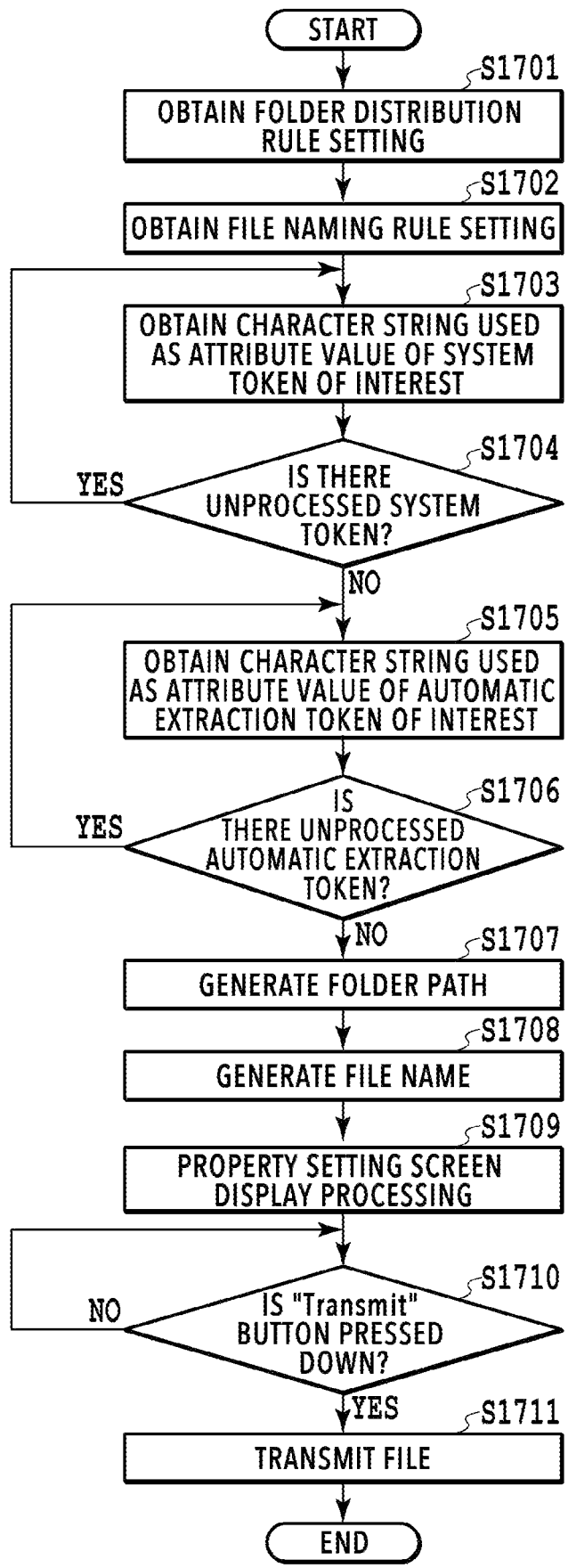
FIG. 17 is a flowchart showing details of property setting screen display processing.

FIG. 17 is a flowchart showing a flow of processing in the PC 111 until a scanned image of a document is filed and transmitted to and stored in the storage server 130. The execution of this flow is started by the display control unit 435 of the PC 111 receiving user instructions to perform the property setting of a processing-target scanned image obtained by the MFP 110 as a trigger. In the following, explanation is given by taking a case as an example where the scanned image of "Estimate Form" displayed within the preview pane 1601 on the property setting screen 1600 shown in FIG. 16 described previously is filed as a processing target. In the following explanation, a symbol "S" represents a step.

At S1701, information on a folder distribution rule for a processing-target scanned image is obtained, which is set in advance via the folder distribution rule setting screen 600 described previously. Here, it is assumed that "'title' (automatic extraction token)/'date (year)' (system token) 'date (month)'' (system token)" is obtained as a folder distribution rule that is applied.

At S1702, information on a file naming rule for a processing-target scanned image is obtained, which is set in advance via the file naming rule setting screen 1500 described previously. Here, it is assumed that "'company name (issuer)' (automatic extraction token) 'underscore' (delimiter token) 'document number' (automatic extraction token)" is obtained as a file naming rule that is applied.

At S1703, for the system tokens included in the information obtained at S1701 and S1702, the character string is obtained, which is the attribute value thereof. Specifically, first, among the system tokens included in the folder distribution rule and the file naming rule both obtained, a system token of interest is determined. Next, the character string corresponding to the environment variable of a user, which corresponds to the attribute name of the determined system token of interest, is obtained from the data management unit 434 of the MFP cooperative server 120. Here, in the obtained folder distribution rule, the two system tokens "date (year)" and "date (month)" are included. On the other hand, in the obtained file naming rule, no system token is included. Consequently, obtaining of the character string, which is the attribute value, is repeated twice and two character strings (for example, character strings of "2022" and "4") are obtained, which correspond to "date (year)" and "date (month)" representing the date of the scan. Then, at S1704, whether or not all the system tokens included in the folder distribution rule and the file naming rule both obtained are processed is determined. In a case where all the system tokens are processed, the processing advances to S1705. On the other hand, in a case where there is an unprocessed system token, the processing returns to S1703, and the next system token of interest is determined and the processing is continued. In a case where no system token is included in each obtained rule, the processing at S1703 and S1704 is skipped and the processing advances to S1705. Unlike the automatic extraction token and the delimiter token, the attribute value of the system token varies dynamically in accordance with the setting of the system. Because of this, it is necessary to update the corresponding character string (attribute value) of each system token each time the system setting changes.

At S1705, for the automatic extraction tokens included in the information obtained at S1701 and S1702, the character string is obtained, which is the attribute value thereof. Specifically, first, among the automatic extraction tokens included in the folder distribution rule and the file naming rule both obtained, an automatic extraction token of interest is determined. Next, the character string corresponding to the attribute type of the determined automatic extraction token of interest is extracted automatically from the scanned image. For this automatic extraction, for example, machine learning is utilized. In the method that utilizes machine learning, a trained model is obtained first by causing a model to learn a large number of test images and character areas of each attribute type, which correspond to the test images. Then, by inputting the processing-target scanned image to the trained model, the character string corresponding to the automatic extraction token of interest is specified and extracted. Here, one automatic extraction token is included in the obtained folder distribution rule and two automatic extraction tokens are included in the obtained file naming rule, and therefore, obtaining of the character string, which is the attribute value, is repeated three times. As a result of that, for each automatic extraction token whose attribute name is "title", "company name (issuer)", and "document number", each character string of "Estimate Form", "Kawasaki Inc.", and "R12-3456" is extracted from the scanned image of "Estimate Form" within the preview pane 1601. Then, at S1706, whether or not all the automatic extraction tokens included in the folder distribution rule and the file naming rule both obtained are processed is determined. In a case where all the automatic extraction tokens are processed, the processing advances to S1707. On the other hand, in a case where there is an unprocessed automatic extraction token, the processing returns to S1705, and the next automatic extraction token of interest is determined and the processing is continued. In a case where no automatic extraction token is included in each obtained rule, the processing at S1705 and S1706 is skipped and the processing advances to S1707.

At S1707, in accordance with the folder distribution rule obtained at S1701, a folder path is generated by using the character string of each system token obtained at S1703 and the character string of each automatic extraction token obtained at S1705. At S1708 that follows, in accordance with the file naming rule obtained at S1702, a file name is generated by using the character string of each system token obtained at S1703 and the character string of each automatic extraction token obtained at S1705. At the time of the generation at S1707 and S1708 described above, in a case where a delimiter token is included in the rule that is applied, the relevant delimiter, such as a period and a space, is inserted. Further, in a case where the character string corresponding to the automatic extraction token is not extracted, a folder path or a file name is generated by using the attribute name of the target automatic extraction token as part of the folder path or the file name, such as "{title}". In a case of a manual extraction token, similarly, it may also be possible to generate a folder path or a file name by using the attribute name of the target manual extraction token by using part of the folder path or the file name, such as "{item 1}".

Figure 18:
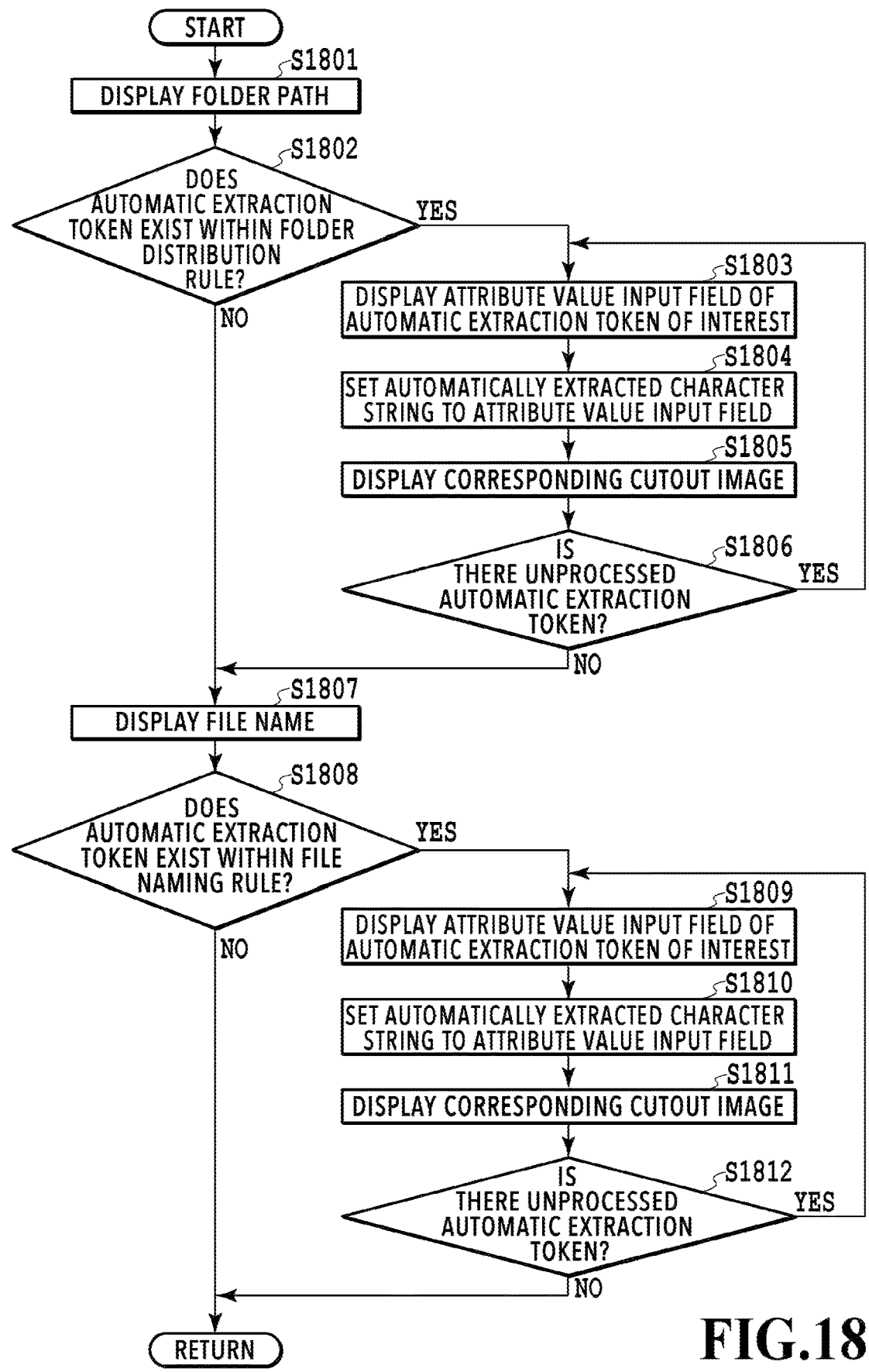
FIG. 18 is a flowchart showing details of the property setting screen display processing.

At next S1709, the property setting screen described previously is displayed on the display (not shown schematically) of the client PC 111. FIG. 18 is a flowchart showing details of processing to display the property setting screen. In the following, detailed explanation is given along the flow in FIG. 18 by taking a case as an example where the property setting screen 1600 in FIG. 16 described previously is displayed.

At S1801, the folder path generated at S1707 is displayed in the folder path display area 1603 on the property setting screen 1600. As described previously, in the example in FIG. 16, "/Estimate Form/202112" is displayed as the folder path. In this case, the portion of "Estimate Form" is the character string extracted as the attribute value of "title", which is an automatic extraction token. Further, the portion of "202112" is the character string representing the date of execution of the scan, which is obtained by integrating the two character strings "2021" and "12" extracted as the attribute values of "date (year)" and "date (month)", which are system tokens. In this case, in a case where the date (year/month/day) of execution of the scan changes, the figures that are allocated to these system tokens change each time the date changes.

At S1802, whether or not an automatic extraction token is included in the folder distribution rule obtained at S1701 is determined. In a case where an automatic extraction token is included, the processing advances to S1803 and in a case where no automatic extraction token is included, the processing advances to S1807. In the example described above, the automatic extraction token whose attribute name is "company name (issuer)" is included, and therefore, the processing advances to S1803.

At S1803, an attribute value input field for the automatic extraction token of interest among the automatic extraction tokens included within the folder distribution rule is displayed. In the example described above, one automatic extraction token is included in the folder distribution rule, and therefore, the one attribute value input field is displayed (the attribute value input field 1605 in FIG. 16). In a case where a plurality of automatic extraction tokens is included, a plurality of attribute value input fields is displayed. In a case where no automatic extraction token is included in the folder distribution rule, the attribute value input field is not displayed.

At S1804, the character string automatically extracted at S1705 is obtained and the character string is set as the attribute value in the attribute value input field displayed at S1803. In the example described above, in the attribute value display area 1608 located under the attribute name display area 1607, the character string "Estimate Form" is set and displayed as the attribute value of the attribute name "title". At S1805 that follows, in the image display area within the attribute value input field in which the attribute value is set, a cutout image corresponding to the set character string is displayed. In the example described above, in the image display area 1609 within the attribute value input field 1605, the cutout image is displayed, which is obtained by cutting out the character area corresponding to the character string "Estimate Form" from the scanned image being displayed in the preview pane 1601. In a case where the target character string is not extracted automatically at S1705, the character string that should be set as the attribute value at S1804 does not exist, and therefore, in the attribute value display area 1608, for example, a character string of "none" is displayed. Further, the corresponding image display area 1609 also becomes blank. Then, at S1806, whether or not all the automatic extraction tokens included in the folder distribution rule are processed is determined. In a case where all the automatic extraction tokens are processed, the processing advances to S1807. On the other hand, in a case where there is an unprocessed automatic extraction token, the processing returns to S1803, and the next automatic extraction token of interest is determined and the processing is continued.

At next S1807, the file name generated at S1708 is displayed in the file name display area 1604 on the property setting screen 1600. As described previously, in the example in FIG. 6, "Kawasaki Inc._R12-3456.pdf" is displayed. In this case, the portion of "Kawasaki Inc." is the character string automatically extracted as the attribute value of "company name (issuer)" and the portion of "R12-3456" is the character string automatically extracted as the attribute value of "document number" and both the character strings are displayed with the delimiter "underscore" being sandwiched in between.

At S1808, whether or not an automatic extraction token is included in the file naming rule obtained at S1702 is determined. In a case where an automatic extraction token is included, the processing advances to S1809 and in a case where no automatic extraction token is included, this processing is exited. Here, as described above, the automatic extraction tokens whose attribute names are "company (issuer)" and "document number" respectively are included, and therefore, the processing advances to S1809.

At S1809, an attribute value input field for the automatic extraction token of interest among the automatic extraction tokens included in the file naming rule is displayed. In the example described above, the two automatic extraction tokens are included in the file naming rule, and therefore, two attribute value input fields (see attribute value input fields 1606a and 1606b in FIG. 16) are displayed. In a case where no automatic extraction token is included in the file naming rule, the attribute value input field is not displayed.

At S1810, the character string automatically extracted at S1705 is obtained and the character string is set as the attribute value in the attribute value input field displayed at S1809. In the example described above, in an attribute value display area 1611a located under an attribute name display area 1610a, the character string of "Kawasaki Inc." is set and displayed as the attribute value of the attribute name "company name (issuer)". Further, in an attribute value display area 1611b located under an attribute name display area 1610b, the character string of "R12-3456" is set and displayed as the attribute value of the attribute name "document number". At S1811 that follows, in the image display area within the attribute value input filed in which the attribute value is set, a cutout image corresponding to the set character string is displayed. In the example described above, in an image display area 1612a within the attribute value input field 1606a, the cutout image is displayed, which is obtained by cutting out the character area of "Kawasaki Inc." from the scanned image being displayed in the preview pane 1601. Further, in an image display area 1612b within the attribute value input field 1606b, the cutout image is displayed, which is obtained by cutting out the character area of "R12-3456" from the scanned image being displayed in the preview pane 1601. In a case where no target character string is extracted automatically at S1705, the character string that should be set as the attribute value at S1810 does not exist, and therefore, in the attribute value display areas 1611a and 1611b, for example, a character string of "none" is displayed. Further, the corresponding image display areas 1612a and 1612b also become blank. Then, at S1812, whether or not all the automatic extraction tokens included in the file naming rule are processed is determined. In a case where all the automatic extraction token are processed, this processing is exited. On the other hand, in a case where there is an unprocessed automatic extraction token, the processing returns to S1809, and the next automatic extraction token of interest is determined and the processing is continued.

The above is the contents of the processing to display the property setting screen. Explanation is returned to the flow in FIG. 17.

The processing at S1710 is processing to check whether instructions to transmit to and store in the storage server 130 are given by a user having completed editing and check of the folder path and the file name for the processing-target scanned image. In a case of the present embodiment, on a condition that the pressing down of a "Transmit" button 1612 within the property setting screen 1600 is detected, the processing advances to S1711. Then, at S1711, transmission processing of filing-target scanned image data is performed. In the example described above, the scanned image data is transmitted to the storage server 130 via the MFP cooperative server 120 as well as the information on the folder path and the file name set on the property setting screen 1600. That is, the storage server access unit 433 of the MFP cooperative server 120 files the received scanned image data by appending a designated file name and stores in the designated folder of the storage server 130.

The above is the flow of the processing until a scanned image of a document is filed and transmitted to and stored in the storage server 130.

As above, in the present embodiment, at the time of creating a rule for a folder path and a file name, it is possible to use a common token (automatic extraction token, system token). Then, even in a case where a common token is used, in the property pane 1602, the folder path and the file name are displayed distinguished from each other.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to set a folder distribution rule and a file naming rule more simply at the time of filing and storing data of a scanned image of a document, a received facsimile and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-070094, filed Apr. 21, 2022 which is hereby incorporated by reference wherein in its entirety.

What is claimed is:

1. An information processing apparatus comprising:
one or more memories storing instructions; and
one or more processors executing the instructions to:
perform display control of a rule setting screen for a user to set a rule relating to property information used for distributing a file of a document image into a folder, wherein
on the rule setting screen, at least a first area for editing the rule, a second area displaying a plurality of items selectable by a user, and a third area displaying an image of a sample document exist,
each of the plurality of items is an element for a user to set a character string configuring the property information,
the plurality of items includes:
a general item corresponding to a character string with a predetermined attribute; and
a particular item for automatically extracting a character string from the document image, which corresponds to an attribute that a user can set arbitrarily,
the rule is created by at least one item selected from the second area by a user being arranged at a predetermined position in the first area, which is designated by the user, and
in the display control, in a case where the particular item being displayed in the second area is activated by a mouse hover, a character area in the image of the sample document being displayed in the third area is highlighted, which corresponds to the particular item activated by the mouse hover.

2. The information processing apparatus according to claim 1, wherein
in the display control, in a case where a specific character area within the image of the sample document being displayed in the third area is activated by a mouse hover, the particular item corresponding to the specific character area is highlighted.

3. The information processing apparatus according to claim 2, wherein
in the display control, in a case where the particular item corresponding to the specific character area activated by the mouse hover does not exist in the second area, a notification to that effect is given.

4. The information processing apparatus according to claim 1, wherein
in the display control, data in which an attribute name of the particular item and a corresponding character area in the image of the sample document are associated with each other is referred to.

5. The information processing apparatus according to claim 1, wherein
in the display control, control is performed to:
display a template selection screen for causing a user to select a desired template from among a plurality of specific templates in which the particular item and the rule setting screen are associated with each other before displaying the rule setting screen; and
display the rule setting screen associated with the template selected via the template selection screen.

6. The information processing apparatus according to claim 1, wherein the designation by a user is implemented by performing an operation to drag an arbitrary item from the second area and an operation to drop the item in the first area and the predetermined position in the first area is a position prepared in advance for performing the drop operation.

7. The information processing apparatus according to claim 1, wherein the property information is a folder path and the rule is a rule to specify one or a plurality of character strings used for the folder path and a hierarchy structure of a folder.

8. The information processing apparatus according to claim 1, wherein the property information is a file name and the rule is a rule to specify one or a plurality of character strings used for the file name.

9. A control method of an information processing apparatus, the control method comprising the step of:

performing display control of a rule setting screen for a user to set a rule relating to property information used for distributing a file of a document image into a folder, wherein on the rule setting screen, at least a first area for editing the rule, a second area displaying a plurality of items selectable by a user, and a third area displaying an image of a sample document exist, each of the plurality of items is an element for a user to set a character string configuring the property information, the plurality of items includes:
 a general item corresponding to a character string with a predetermined attribute; and
 a particular item for automatically extracting a character string from the document image, which corresponds to an attribute that a user can set arbitrarily, the rule is created by at least one item selected from the second area by a user being arranged at a predetermined position in the first area, which is designated by the user, and in the display control, in a case where the particular item being displayed in the second area is activated by a mouse hover, a character area in the image of the sample document being displayed in the third area is highlighted, which corresponds to the particular item activated by the mouse hover.

10. A non-transitory computer readable storage medium storing a program for causing a computer to perform a control method of an information processing apparatus, the control method comprising the step of:

performing display control of a rule setting screen for a user to set a rule relating to property information used for distributing a file of a document image into a folder, wherein on the rule setting screen, at least a first area for editing the rule, a second area displaying a plurality of items selectable by a user, and a third area displaying an image of a sample document exist, each of the plurality of items is an element for a user to set a character string configuring the property information, the plurality of items includes:
 a general item corresponding to a character string with a predetermined attribute; and
 a particular item for automatically extracting a character string from the document image, which corresponds to an attribute that a user can set arbitrarily, the rule is created by at least one item selected from the second area by a user being arranged at a predetermined position in the first area, which is designated by the user, and in the display control, in a case where the particular item being displayed in the second area is activated by a mouse hover, a character area in the image of the sample document being displayed in the third area is highlighted, which corresponds to the particular item activated by the mouse hover.

* * * * *